March 24, 1953  T. J. LEHANE  2,632,600
TEMPERATURE CONTROL SYSTEM FOR RAILWAY CARS
Filed April 27, 1949

INVENTOR.
Timothy J. Lehane
BY
Harvey M. Gillespie
Atty.

Patented Mar. 24, 1953

2,632,600

UNITED STATES PATENT OFFICE 2,632,600

TEMPERATURE CONTROL SYSTEM FOR RAILWAY CARS

Timothy J. Lehane, North Riverside, Ill., assignor to Vapor Heating Corporation, Chicago, Ill., a corporation of Delaware Application April 27, 1949, Serial No. 89,911

3 Claims. (Cl. 237—6)

This invention relates to a heating system in which heated air is delivered into a plurality of enclosed spaces, and more particularly to an automatic system in which a plurality of thermostats are provided, with one in each of several of said enclosed spaces, and so arranged that one or more of said spaces may be kept at lower temperatures if desired and automatically maintained at such cooler temperature in relation to the control of the temperature in a warmer room supplied with heat from the same source.

In the heating of railroad cars and other groups of enclosed spaces it is often desired by the occupant of one room or enclosed space to have the temperature therein lower than that desired by the occupant or occupants of other rooms or spaces. For convenience the term room will be used herein to designate either a single room or a plurality of intercommunicating rooms which together form a closed space. A thermostat will be located in each of said rooms, which plurality of thermostats will, according to the present invention, be so hooked up that the heating medium will not be introduced into the heater until the temperature in all of the rooms has fallen below a predetermined value, that is to say the heating medium will not be delivered to the common heating element of all rooms as long as the temperature in any one of the rooms is at or above said predetermined value. This enables the occupants of the various rooms to maintain a lower temperature in their room if desired, as for example by opening a window or ventilator.

Among the objects of the present invention are: to provide a novel and improved heating system; to provide a heating system having a plurality of thermostats so arranged that the circuit through any one or more of them less than all of them, may be broken without turning on the heating medium; to provide a heating system having a plurality of thermostats arranged one in each of different rooms so that the heating medium will not be turned off as soon as any one of the several thermostats is satisfied; to provide an automatic heating system having a thermostat in each of several rooms, and in which system one of said rooms (the warmest of the group) may be used as a control room and the thermostat thereof will automatically control the turning on and off of the heating medium to an element supplying heat to all of the rooms even after the circuit through all of the other thermostats remain broken; to provide an automatic heating system having a circuit through a valve relay, and a plurality of thermostats connected in parallel with each other in a shunt around the valve relay so that all of the thermostats must be open before the valve relay is energized; to provide an automatic heating system having greater adaptability for different temperatures in different rooms; and such further objects, advantages and capabilities as will more fully appear from the detailed description of the specific embodiment shown in the drawing.

The invention is illustrated in one preferred embodiment in the accompanying drawing wherein.

Figure 1:
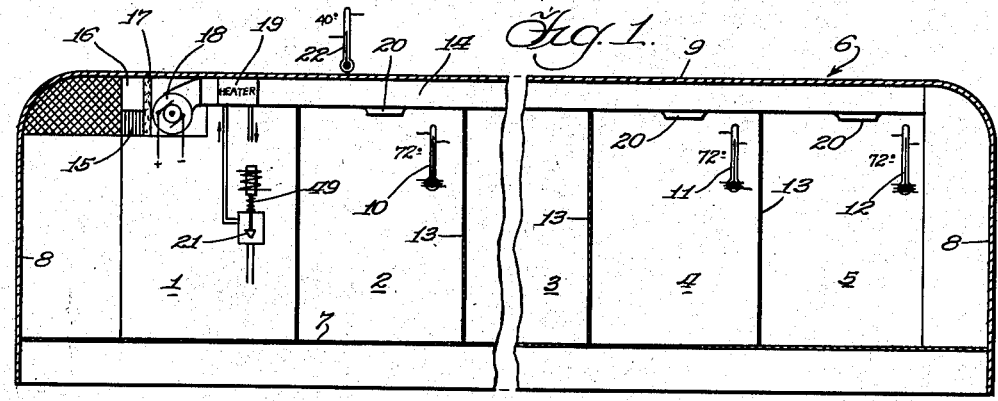
Figure 1 is a fragmentary, vertical, longitudinal section through a railway car, or other group of rooms, having a heating system embodying the present invention.

In the form shown, for illustrative purposes only, in the drawing, the invention is disclosed for use with a plurality of rooms 1, 2, 3, 4 and 5 (it being understood that any greater or less number may be used as desired) in a railway car 6 having a floor 7, ends 8 and a roof 9. Each of the rooms, or group of rooms or compartments, is provided with a thermostat, and for brevity and simplicity of understanding only three of such thermostats will be used in the description and shown in the wiring diagram. These thermostats 10, 11 and 12 are located in any desired position in the room and will be wired in the system in the manner indicated generally in the wiring diagram. The rooms will be separated from each other by partition walls 13 and running longitudinally of the car between the room ceilings and the roof of the car is a heated-air duct 14.

Positioned near one end of the upper portion of the car are a number of louvers 15 or openings for adjustably permitting the passage of air from within the car to the space 16, from where it passes through the air filter 17 to the inlet of the blower fan 18. When the blower is in operation this air will be forced over the heater 19 and along the air duct 14, from where it will enter the rooms through the grills, registers, or openings 20 formed in the bottom of the duct and at the tops of the rooms. A steam valve 21 is provided for controlling the entry of steam into the coils of the heater, this valve being spring opened, and closed upon the energization of a valve relay as will be later more fully explained. Positioned at any desired location on the outside of the car is an outside thermostat 22 which in the present installation is set to close at 40° F. Any other suitable temperature setting may be selected for this thermostat.

Figure 2:
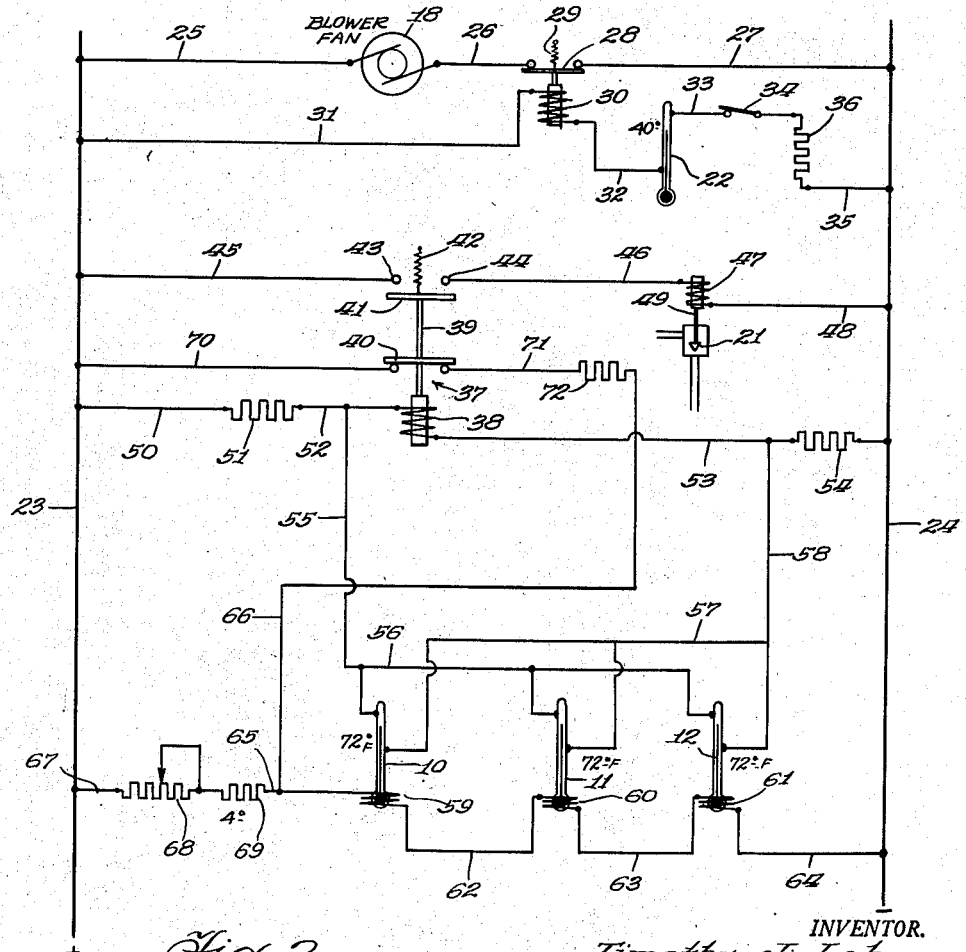
Fig. 2 is a wiring diagram of the electrical circuits, and parts shown diagrammatically, of the system.

Referring to the wiring diagram in Fig. 2, there are provided the positive lead wire 23 and the negative lead wire 24, these wires being connected to any suitable battery for furnishing electric current for the car. As seen at the top of Fig. 2 the blower fan 18 is connected between the leads 23 and 24 by the wires 25, 26 and 27. Wire 26 at its opposite end is connected with one of the fixed contacts of a fan switch 28, and wire 27 from lead 24 is connected with the other stationary contact of a fan switch. The said contact 28 is closed by a spring 29 and opened when the solenoid coil 30 is energized. The opening and closing of switch 28 will control the stopping and starting of the fan blower.

The solenoid coil 30 of the fan switch is connected at one end through wire 31 with lead 23, and at its other end through wire 32 with the lower contact of the outside thermostat 22. The upper contact of thermostat 22 is connected with the lead wire 24 through wire 33, switch 34 and wire 35 having suitable resistance 36. The outside thermostat in the present instance is set to close when the outside temperature reaches 40° F. and to open when the temperature falls below that value. From this it will be seen that when the outside temperature is below 40° F. (assuming the switch 34 to be closed) the solenoid coil 30 will be de-energized and the switch 28 closed by spring 29, which will operate the blower fan and force air through the heater and into all rooms. When the outside temperature is up to or greater than 40° F. the solenoid coil will be energized and open switch 28 and stop the blower fan. Consequently the blower fan is made available any time that the outside temperature falls below 40° F.

The connection and operation of the room thermostats and the steam valve will now be explained. A valve relay indicated generally at 37 is provided for effecting the opening and closing of the steam valve 21 under control of the room thermostats 10, 11 and 12. This valve relay is shown for illustrative purposes as being of the solenoid type having a wire coil 38 and a core stem 39 carrying a pair of spaced bridge members 40 and 41 fixed to move therewith, this stem being normally urged upwardly by the tension spring 42, and moved downwardly when coil 38 is energized. When the coil is de-energized the stem is moved upwardly to cause bridge arm 41 to engage the contacts 43 and 44 and close the circuit consisting of the lead 23, wire 45, contact 43, bridge arm 41, contact 44, wire 46, solenoid coil 47, wire 48 and lead 24, to close the steam valve 21 and cut off steam from the heater 19. The steam valve is provided with a spring 49 to open it when the coil 47 is de-energized. It is thus seen that the steam valve 21 is spring opened and energized closed.

Valve relay coil 38 is in the circuit leading from lead 23 through wire 50, resistance 51, wire 52, coil 38, wire 53, and resistance 54 to lead 24. Each of the room thermostats 10, 11 and 12 is provided with an upper contact and a lower contact each connected with an outside wire and the interior passageway in the thermometer, so that when the temperature is high enough to cause the mercury column to engage both of said contacts a current of electricity will flow therethrough and when the mercury is below the upper contact the circuit will be broken and the current stopped. It is important to note in Fig. 2, that the room thermostats are connected in parallel with each other in a shunt around the valve relay so that all of these thermostats must be open before the valve relay is energized to open the circuit through valve solenoid 47 and thereby permit the spring 49 to open the steam valve, but the steam valve is closed upon the closing of any one of these thermostats. This shunt leads from wire 52 on one side of the valve relay coil 38, through wires 55 and 56, which latter connects with each of the upper contacts of the thermostats and from each of the lower contacts to wires 57 and 58 and back to wire 53 on the other side of the valve relay coil 38, wire 53 connecting with lead 24 to complete the shunt circuit. It is thus seen that when any one of the room thermostats is closed, current will flow through the shunt circuit and de-energize valve relay coil 38 thus permitting spring 42 to close switch 41 and energize the steam valve coil 47 to hold the steam valve closed. This prevents heating medium from flowing into the heater 19.

From the above it is also apparent that when all of the room thermostats are open (the mercury column having receded below the upper contacts thereof), no current can flow through the shunt circuit, and the valve relay coil 38 will be energized to draw stem 39 downwardly, open switch 41, and de-energize the steam valve solenoid coil 47, which permits the steam valve to open under action of spring 49 and introduce steam into the heater to heat the rooms. As will be understood, when the outside temperature is above 40° F. it will not be necessary to have the blower fan operating, as enough heated air will pass through the duct 14 and openings 20 into the rooms without the aid of the blower fan.

In order to provide a more sensitive control of the heating system, means are provided for causing each thermostat, which happens to be in control of the system, to cycle whenever more heat is required in the particular room or compartment that the thermostat controls. For this purpose auxiliary heat is applied in equal amounts to all thermostats. For example the room thermostats 10, 11 and 12 are provided with electrical heaters 59, 60 and 61, respectively. These auxiliary heaters are interconnected in series by wires 62, 63 and 64, which latter wire is connected to lead 24. Auxiliary heater 59 is connected to each of wires 65 and 66. Wire 65 forms part of a circuit comprising wire 67 connected to lead 23, a variable resistor 68 having a maximum of 4°, and a metered resistance 69 connected with wire 65. Wire 66 forms part of a circuit comprising wire 70 connected to lead 23, valve relay switch 40, wire 71 and a 2° metered resistance 72 to which wire 66 is connected.

It is thus seen that the three room thermostats 10, 11 and 12 (of which any greater or less number may be used as required so as to have one in each room) being connected in parallel, are arranged so that when any one of them is closed the main portion of the current will be diverted away from the valve relay coil 38 which during such time will remain de-energized and the spring 42 will close switch 41 and open switch 40 of the relay. This energizes the steam valve solenoid coil 47 and holds the steam valve 21 closed. The switch 40 being open at this time, removes the 2° auxiliary heat produced by the electrical current passing through the metered resistance 72 and thereby permit the auxiliary heaters 59, 60 and 61 to cool sufficiently to enable the thermostat reading to represent the room temperature. If desired, said last thermostat to close may be located in a particular room chosen as a control room to control the application of heating medium to the heater 19 for the entire car, apartment, or wherever the system is being used. Thus any one or more of the rooms (short of all of them) may be kept as cool as the occupant may desire, by opening a window or the like, without interfering with the temperature in any of the other rooms.

When, however, the last thermostat is opened by falling temperature due to the steam valve being closed, the current will no longer be shunted away from the valve relay coil 38, but will pass therethrough in full strength to energize the same, open switch 41, de-energize steam valve coil 47 and permit the spring 49 to open steam valve 21 to introduce steam into the heater 19. At the same time relay switch 40 will be closed to pass electric current through resistance 72 and add 2° F. additional heat to each of the auxiliary heaters 59, 60 and 61. These auxiliary heaters will, however, be already receiving 4° heat from the variable resistor 68 unless the same has been selectively adjusted to a lower amount. By the above means the room thermostats in control of the system will be made to cycle as desired and thereby cause the valve 21 to open at frequent intervals to deliver small increments or bursts of steam to the heating system as required for more uniform heating.

The room thermostats are so built or set that they will close at a predetermined temperature, as for example 72° or any other desired temperature value, which includes the additional cycling temperature added to the mercury bulbs through the auxiliary heaters 59—61 without unduly increasing the actual room temperature. It must be kept in mind, however, that this cycling action will not occur until the last room thermostat is opened, as prior to that time the relay switch 40 will be open because of the valve relay coil 38 being de-energized.

The principle of the present automatically controlled heating system is also applicable to any form of radiators for the individual rooms provided that all of the radiators are controlled by a single valve.

I claim:

1. A temperature control system for controlling the temperature of a plurality of enclosed spaces, comprising, in combination, means defining a duct extending along the enclosed spaces and having openings therein communicating with said enclosed spaces, a heater positioned in one end of said duct, a blower fan for forcing air over and through said heater into said duct and thence into the several enclosed spaces, an outside thermostat, a blower fan solenoid switch for stopping the blower fan when the outside temperature reaches a predetermined temperature value, means for delivering heating medium to said heater including an electrically actuated valve for controlling the delivery of heating medium, means for controlling the energization of said valve comprising a relay for making and breaking an energizing circuit through said electrically actuated valve, and means for controlling the operation of said relay comprising a plurality of thermostats, one for each enclosed space, connected in parallel in said relay energizing circuit in shunt around said relay and each responsive to a predetermined temperature of the space in which it is located to by-pass the electric current around said relay so as to de-energize said relay.

2. A temperature control system according to claim 1, in which the electrically energized valve is provided with a spring for opening the valve when the said relay is de-energized.

3. A temperature control system according to claim 2 in which the thermostats are provided with auxiliary electrical heater connected in series and in which a measured volume of heating current is delivered to said auxiliary heaters connected through said relay and effective when the said valve is opened to deliver heating medium to the heater.

TIMOTHY J. LEHANE.

REFERENCES CITED

The following references are of record in the file of this patent:

UNITED STATES PATENTS

| Number | Name | Date |
|---|---|---|
| 2,235,620 | Nessell | Mar. 18, 1941 |
| 2,254,813 | Anderson | Sept. 2, 1941 |
| 2,476,199 | Lehane | July 12, 1949 |

FOREIGN PATENTS

| Number | Country | Date |
|---|---|---|
| 146,245 | Austria | June 25, 1936 |